United States Patent Office 2,718,385
Patented Sept. 20, 1955

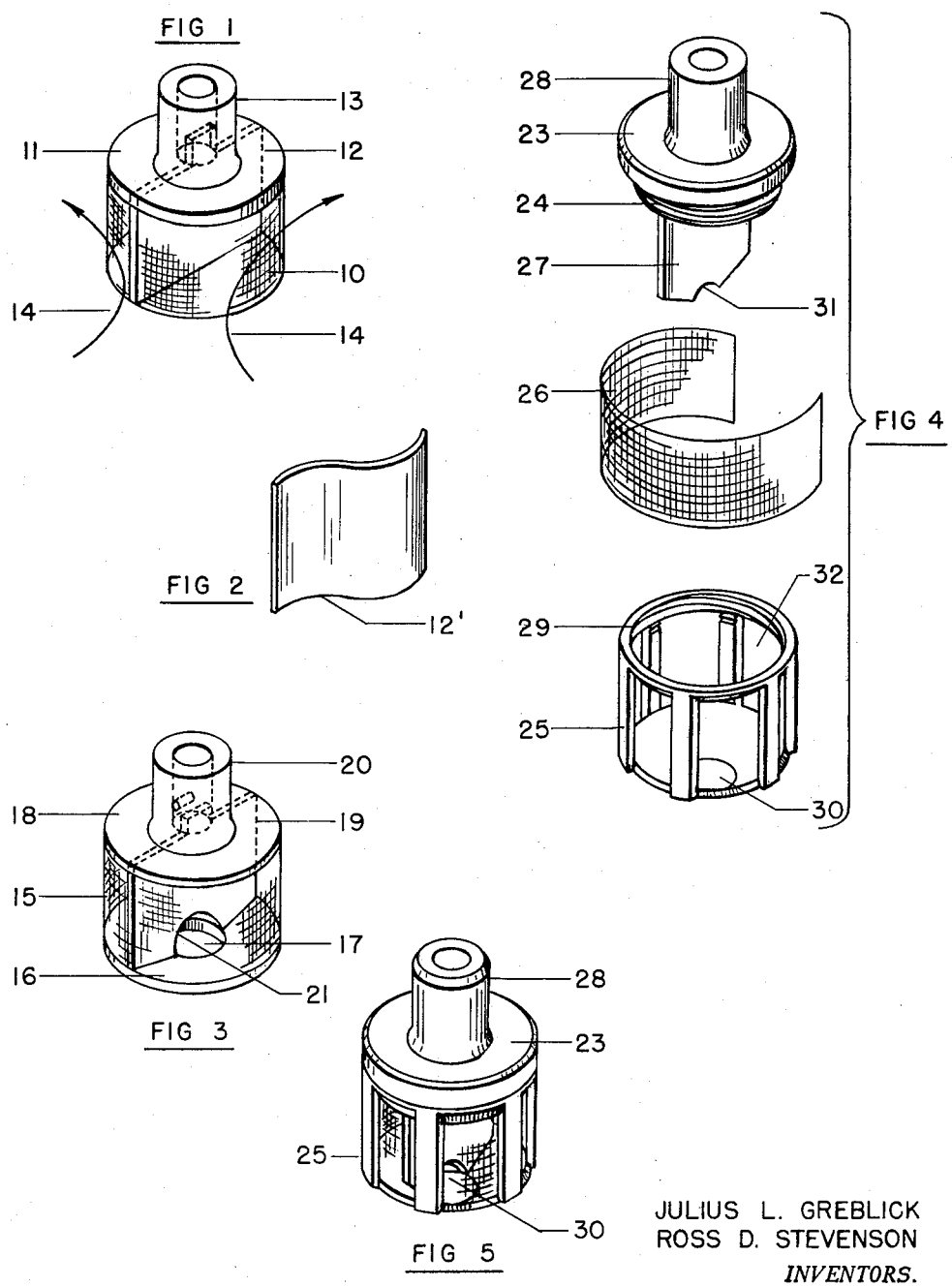

2,718,385

STIRRING APPARATUS

Julius L. Greblick, Detroit, and Ross D. Stevenson, Ferndale, Mich., assignors to Ethyl Corporation, New York, N. Y., a corporation of Delaware Application December 23, 1952, Serial No. 327,626

2 Claims. (Cl. 259—133)

The present invention relates to a stirring apparatus, and more particularly to an improved type of stirrer head which is suitable for agitating and imparting a high degree of shearing force upon a fluid medium. Our invention is especially useful in preparing emulsions and suspensions or dispersions of alkali metals in fluid mediums.

There are numerous instances in the chemical and other industries wherein it is necessary to subject a fluid or a fluid mixture to a relatively high degree of agitation or stirring action. In many of these situations the well-known conventional paddle or beater-type stirrers fail to impart the degree of agitation necessary to accomplish the intended result. This is true, for example, when preparing emulsions and dispersions or suspensions of the alkali metals. Similarly, such conventional stirrers frequently do not provide adequate agitation for reaction mixtures which tend to "set up" into a solid immobile mass. A typical example of this latter difficulty can be observed in the Bouveault-Blanc process wherein high molecular weight alcohols are prepared by reducing fatty acid esters with metallic sodium. In this process the reaction mixture frequently tends to "set up" to an immobile mass due to the formation of insoluble intermediates. If this occurs when using a paddle-type stirrer it results in incomplete mixing of the reactants, and in many instances the stirrer will merely drill a hole in the reaction mass. It has been suggested that conventional stirrers fail to adequately function in the above situations because insufficient shearing force is imparted to the fluid or mixture under treatment. Although this may or may not be the correct explanation of the shortcomings of this conventional equipment, it has been found that in order to prepare emulsions and dispersions it is generally necessary to impart a high degree of shearing force upon the fluid. For the most part, this has been achieved by resorting to somewhat complex and expensive apparatus such as colloid mills. Although colloid mills and the like can be successfully employed to form emulsions and alkali metal dispersions, their use is somewhat limited because of their cost. There is, therefore, a need for a simple and inexpensive stirring mechanism which will efficiently provide a much higher degree of agitation and shearing force than can normally be achieved with the conventional paddle-type stirrers.

It is therefore an object of our invention to provide a new and relatively simple stirring device. It is a further object of our invention to provide an improved stirring device which is capable of imparting a high degree of shearing force to a fluid or fluid mixture. A still further object of our invention is to provide an inexpensive stirring head which is simple in construction and can be adapted for both large and small-scale operation. These and other objects of our invention will become apparent from a consideration of the following description and drawings wherein:

Figure 1 is an isometric view illustrating one embodiment of our invention;

Figure 2 illustrates an alternative form of vane which can be used in our invention;

Figure 3 is an isometric view illustrating a preferred embodiment of the present invention;

Figure 4 is an exploded view illustrating the various components of a further embodiment of our invention; and Figure 5 is an isometric view showing the apparatus of Figure 4 fully assembled.

Considered broadly, the stirring apparatus which constitutes our invention consists of a sheet or strip of foraminous material, such as loosely woven fabric, wire mesh, screen or the like disposed in the form of a hollow cylinder which is closed at one end by means of a solid plate and is at least partially open at the other end. A vane member is positioned within the cylinder, and means are provided on the aforementioned plate for attaching the apparatus to a rotatable shaft. In operation, the apparatus is immersed in a body of the fluid which is to be stirred or agitated, and rotated at a relatively high speed. The fluid is more or less sucked or pumped into the cylinder through the open end and thrown outwardly through the cylinder walls by the action of the vane member. This imparts a high degree of shearing force on the fluid so as to thoroughly and efficiently agitate and mix whatever fluid is under treatment.

Referring now to Figure 1, the apparatus in its simplest form consists of a sheet or strip of foraminous material disposed in the form of a hollow cylinder 10, a circular plate 11, which is positioned at the upper end of the cylinder 10 so as to substantially close the cylinder at that end, and a rigid vane member 12 which is positioned within the cylinder 10, the upper portions of said vane member being indicated by broken lines. Preferably, means such as a spindle 13 are provided on the plate 11 so as to permit the attachment of the assembly to a rotatable shaft although the plate 11 can be secured directly to a rotatable shaft if desired. These various components can be constructed of any suitable material, although we have found it convenient to employ metals, such as mild steel, brass, or copper, so as to permit the use of welding or brazing in assembling the apparatus. For most applications it is convenient to use a wire mesh or screen for the cylinder 10 although a stiff loosely-woven fabric of either natural or synthetic fiber can be used.

In operation the assembled apparatus as illustrated in Figure 1 is totally immersed in a body of fluid which is to be agitated. As the head is rotated the fluid is drawn upwardly into the cylinder 10, as indicated by the flow lines 14, and thrown outwardly through the sides of the cylinder 10 due to the centrifugal force imparted to the fluid by the vane 12. Thus, the fluid is not only subjected to a high speed beating action by virtue of the vane 12, but is also subjected to high shearing forces as the fluid passes through the openings in the walls of the cylinder 10. The net effect of this action is to completely and uniformly mix and agitate the body of fluid in which the head is being rotated.

Although the cylinder 10 can be formed of any suitable foraminous material, for most applications a wire mesh or screen is satisfactory. The size of the openings or foramina in the cylinder 10 are likewise not critical and will depend to some extent upon the particular use for which the stirrer is intended. For example, in preparing sodium dispersions by vigorously agitating a mixture of molten sodium and inert liquid, a 10 to 150 mesh screen has been found to give very good results. On the other hand, when the stirrer is to be used in preparing liquid-liquid emulsions, a 50 to 200 mesh screen can be used. Similarly, where the apparatus is being employed to thoroughly agitate the relatively viscous reaction mixture, a screen of about 20 to 80 mesh is preferred; and when the particular mixture contains some solid matter, a screen having somewhat larger openings is preferred so as to avoid excessive plugging of the openings.

The vane member 12 is shown in Figure 1 as being a rectangular plate, and this represents the preferred construction. Figure 2, however, illustrates an alternative form of vane 12' that can be used if desired. In this instance the vane 12' has a curved or arcuate configuration. The particular configuration of the vane member is therefore not critical as it is only necessary that the vane be positioned within the cylinder so as to impart centrifugal force to the fluid mixture when the assembly is rotated.

Figure 3 illustrates an especially preferred embodiment of our invention wherein a cylinder 15 of foraminous material is partially closed at one end by means of an annulus or ring member 16 provided with an opening 17 at its center. Again, a circular plate 18 is positioned at one end of the cylinder 15, and a vane member 19 is positioned within the cylinder 15, the upper portions of said vane member being indicated by broken lines. A spindle 20 is also provided so as to permit the attachment of the assembly to a rotatable shaft. As shown in Figure 3, the vane member 19 is provided with an arcuate opening 21 which cooperates with the opening 17 in the annulus 16 so as to facilitate movement of the fluid upwardly through the opening 17 into the cylinder 15. Although this latter feature represents the preferred construction of the vane 19, the opening 21 can be omitted if desired.

The operation of the apparatus shown in Figure 3 is substantially identical to that described in connection with Figure 1. The particular construction shown in Figure 3, however, has some advantages over that of Figure 1 in that the annulus 16 not only provides for a more rigid and rugged construction but also increases the pumping action imparted to the fluid when the head is operated. Since the opening 17 somewhat restricts the flow of fluid upwardly into the cylinder there is actually more lifting force acting upon the fluid. Therefore, this embodiment is especially suitable for agitating the stirring relatively viscous or heavy fluids.

Figures 4 and 5 illustrate a still further embodiment of our invention which is more flexible than the apparatus heretofore described in the sense that the foraminous cylinder through which the fluid passes is readily replaceable. As previously indicated, the use for which a particular stirrer head is intended will dictate to some extent the mesh size chosen for the foraminous cylinder. Therefore, the apparatus shown in Figures 4 and 5 is recommended for those instances wherein the stirrer is to be used in a number of varied applications.

Referring to Figures 4 and 5, the apparatus consists of a circular plate 23 which is provided with means, such as threads 24, to which can be secured a retaining member 25 for holding a foraminous cylinder 26 in operative position. A vane member 27 is secured to the plate 23 so as to be positioned within the foraminous cylinder 26 when the apparatus is fully assembled as shown in Figure 5. Means such as a spindle 28 are provided on the plate 23 for securing the assembly to a rotatable shaft. The retaining member 25 is essentially cup-shaped and is provided with threads 29 which are adapted to engage threads 24 on the circular plate 23 when the apparatus is assembled. The base of the retaining member 25 is provided with an opening 30. When the apparatus is fully assembled, as shown in Figure 5, the opening 30 cooperates with an arcuate opening 31 in the vane member 27 so as to provide a passage through which the fluid will pass in entering the cylinder. Openings 32 are provided in side walls of the retaining member 25 so as to permit the fluid to pass outwardly through the openings or foramina in the cylinder 26 when the head is operated.

The apparatus illustrated in Figures 4 and 5 is assembled by merely inserting the foraminous strip or cylinder 26 within the retaining member 25. Thus, the retaining member 25 is adapted to telescope over the member 26. The retaining member 25 with the cylinder 26 inserted therein is then threaded to the circular plate 24. When it is desired to replace the cylinder 26 with one having different size openings, the retaining member 25 is disassembled from the plate 24. The cylinder 26 is removed from within the retaining member 25 and a new cylinder inserted in its place. The operation of the apparatus shown in Figures 4 and 5 is identical to that previously described in connection with stirrer heads shown in Figures 1 and 3.

As previously indicated, the apparatus of our invention is especially useful in preparing alkali metal dispersions. The following example, wherein a sodium dispersion is prepared, will thus illustrate one of the many applications of our improved stirring head. In this example all parts and percentages stated are on a weight basis.

*Example*

Four hundred and fifty-four parts of metallic sodium and 500 parts of heavy alkylate were placed in a vessel and heated to 130° C. When the sodium was completely fused, a stirring head identical to that shown in Figure 3 was immersed in the mixture. In this instance the cylinder 15 was constructed of 80 mesh stainless steel screen. The stirrer head was then operated at between 10,000 and 15,000 R. P. M. while maintaining the mixture at a temperature between 120° C. and 130° C. Four parts of oleic acid were added after the agitation was started, the acid serving as a dispersing agent. After the stirrer had been operated for a period of ten minutes a sample of the dispersion was withdrawn and found to have an average sodium particle size of 5 microns. At the end of about 35 minutes the average particle size of the sodium was found to be only 3 microns, and these very small sodium particles were uniformly distributed throughout the body of alkylate.

Having described our invention in detail, it can be seen that we have provided a simple and relatively inexpensive stirring head which is capable of imparting a high degree of shearing force to fluid bodies. It is to be understood that the above example is given merely to illustrate one application of our invention, and we do not intend that our invention be limited to the specific embodiments described therein, as other modifications will become apparent of those skilled in the art. We, therefore, intend by the appended claims to cover all modifications falling within the spirit and scope of our invention.

We claim:

1. A stirrer head suitable for agitating fluid substances when rotated therein, comprising a hollow cylinder of foraminous material, a circular plate positioned at one end of said cylinder and substantially closing said end, a vane member transversely disposed within said cylinder, and a retaining means having openings therein generally surrounding said cylinder and readily detachable from said plate for maintaining said cylinder in assembled relationship with said plate and said vane member.

2. A stirrer head suitable for agitating fluid substances when rotated therein, comprising in combination a hollow cylinder of foraminous material, a circular plate positioned at one end of said cylinder and substantially closing said end, a vane member transversely disposed within said cylinder, and means generally surrounding said cylinder and readily detachable from said plate for retaining said cylinder in assembled relationship with said plate and said vane member, said means comprising a cup-shaped retainer provided with an opening in the base thereof so as to permit the admission of fluid into said cylinder, and having openings at the sides thereof so as to permit the passage of fluid outwardly from the interior of the cylinder.

References Cited in the file of this patent

FOREIGN PATENTS

| | | |
|---|---|---|
| 562,921 | Great Britain | July 21, 1944 |
| 664,464 | Great Britain | Jan. 9, 1952 |